(12) United States Patent  
Koike

(10) Patent No.: US 9,165,228 B2
(45) Date of Patent: Oct. 20, 2015

(54) PRINTING APPARATUS ALLOWING USER CHANGE OF OPERATIONAL CONTROL OF JOB, CONTROL METHOD THEREOF, AND STORAGE MEDIUM

(71) Applicant: CANON KABUSHIKI KAISHA, Tokyo (JP)

(72) Inventor: Hisashi Koike, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/901,403

(22) Filed: May 23, 2013

(65) Prior Publication Data

US 2013/0314733 A1    Nov. 28, 2013

(30) Foreign Application Priority Data

May 25, 2012    (JP) ................................. 2012-119780

(51) Int. Cl.
*G06K 15/02* (2006.01)
*G06F 3/12* (2006.01)

(52) U.S. Cl.
CPC .......... *G06K 15/1886* (2013.01); *G06F 3/1205* (2013.01); *G06F 3/1258* (2013.01); *G06F 3/1285* (2013.01); *G06K 15/1809* (2013.01); *G06K 15/1811* (2013.01); *G06K 15/1817* (2013.01)

(58) Field of Classification Search
CPC .. G06F 3/12; G06K 15/1809; G06K 15/1811; G06K 15/1817; G06K 15/1886

USPC ....................................... 358/1.13, 1.14, 1.15
See application file for complete search history.

(56) References Cited

U.S. PATENT DOCUMENTS

| | | | |
|---|---|---|---|
| 2002/0027673 A1* | 3/2002 | Roosen et al. | 358/1.13 |
| 2010/0123926 A1* | 5/2010 | Kitani | 358/1.15 |
| 2011/0102837 A1* | 5/2011 | Kanai | 358/1.15 |
| 2012/0293816 A1* | 11/2012 | Bito | 358/1.13 |

FOREIGN PATENT DOCUMENTS

| | | |
|---|---|---|
| CN | 102035972 A | 4/2011 |
| JP | 2871275 B2 | 3/1999 |
| JP | 3847970 B2 | 11/2006 |
| JP | 2012-081726 A | 4/2012 |

* cited by examiner

*Primary Examiner* — Fred Guillermety
(74) *Attorney, Agent, or Firm* — Canon U.S.A., Inc. IP Division

(57) ABSTRACT

A printing apparatus includes an accepting unit configured to accept a print job, a first determination unit configured to determine whether the accepted print job is of a first type or a second type, a second determination unit configured to, if the first determination unit determines the accepted print job as the first type and if a job control code included in the accepted print job indicates hold, determine that data of the accepted print job is to be held, if the first determination unit determines that the accepted print job as the first type and if the job control code indicates print, determine that the data of the accepted print job is to be printed, and if the first determination unit determines that the accepted print job as the second type, determine that the data of the accepted print job is to be held.

6 Claims, 6 Drawing Sheets

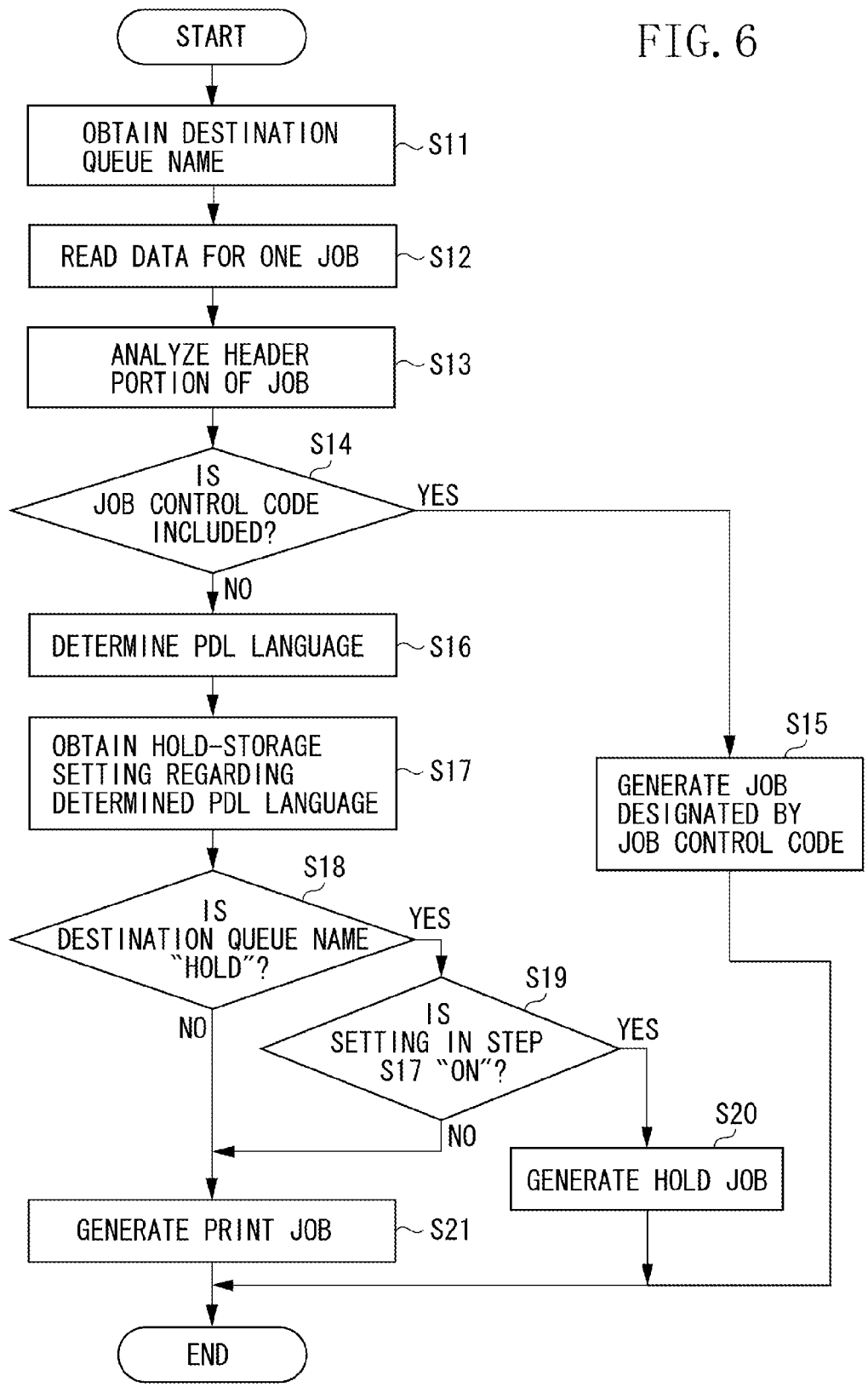

PRINTING APPARATUS ALLOWING USER CHANGE OF OPERATIONAL CONTROL OF JOB, CONTROL METHOD THEREOF, AND STORAGE MEDIUM

BACKGROUND OF THE INVENTION

1. Field of the Invention

The present invention relates to a printing apparatus, a job generation method, and a storage medium.

2. Description of the Related Art

Various printers are available these days ranging from a low-end personal printer to a high-speed machine targeting exclusive users. A high-speed Print On Demand (POD) machine for exclusive users provides outstanding processing performance but is expensive. Thus, a less-expensive model called LitePOD is introduced to the market. A LitePOD includes an office-use printer engine with comparatively high-speed processing capability and a controller which can also be used for a POD machine. The LitePOD can be used, as a network printer, by a plurality of users using host computers thereof but the LitePOD can also perform printing via a server called a core system (backbone system).

Regarding printing via the core system, there is a widely-known server application called Raster Document Object (RDO) Print. The RDOPrint converts an RDO file into raw (native) PostScript language without a control code. After the conversion, the file can be printed by a printer of any manufacturer so long as the printer can interpret PostScript. Thus, the user can flexibly operate the system.

A user of a printer such as the LitePOD can print a job immediately after the job is submitted to the printer. In addition, the printer can also provide print-related functions. For example, once a job is set to "hold" by the printer, the user can check the attribute setting of the job, print one set and print more at a later time after confirming the printing. If the user finds a problem, the user can change the setting. When a user submits a job from the host computer and designates whether to print or hold the job via a driver screen of, for example, Microsoft Windows (registered trademark), the driver adds a job control command specific to the printer and transmits the job to the printer in packets. However, if the job is written in a native language, such as the job sent from a core system server, it is difficult to add a job control command specific to the printer. Therefore, a different method is used to designate the job operation. For example, if a Line Printer Daemon protocol (LPD) is used, the user can designate a queue name as a character string. For example, if the user sends a job with a destination queue name of "Print" according to the settings of the server application, the job will be printed. On the other hand, if the user sends a job with a destination queue name of "Hold", the job will be temporarily spooled in a print server or a printer controller or the job is stored after the interpretation of the data is finished.

Further, there is a known function called a hot folder. If a Portable Document Format (PDF) file is moved to a folder on the host computer, the job is sent to the printer according to a protocol set in advance. By preparing a plurality of hot folders with different settings and moving the file to one of the folders depending on the user's needs, the job can be easily transmitted to the printer. The above-described LPD can be used for this transmission protocol.

Japanese Patent No. 3847970 discusses a method for correctly processing jobs when a print job is transmitted from a driver to the printer or a job of a different protocol such as the LPD is submitted to the printer.

Further, Japanese Patent No. 2871275 discusses a method for selecting the optimum interpreter, even if the received job is written in a different type of native page description language (PDL), according to determination of the language type from the content of the data.

If a LitePOD machine described in the background of the invention is used for printing a job, whether to immediately print or hold the job can be designated from the job submitting side. However, if a print job is sent from a core system, since the operation of the job is determined by the settings set from the server, the user is unable to change the setting on whether to immediately print or hold the print job sent from the core system. This is inconvenient for the user since there may be various cases where, for example, the user may desire to immediately print the job sent from the core system, change the settings before printing the job, or stop the printing of the core system alone until special paper used for the job is supplied.

Although an entire printer system may have a function to change the control method, it is not desirable for the users who submit jobs via the driver or the hot folder that the operation of the job may be changed in ways unintended by the users.

It is possible to provide the printer with a function that can change the job control method in units of protocols or in units of job sources. However, if the protocol is, for example, a one-way communication protocol such as the LPD and a different job route exists, this will cause a problem. For example, if a user sets a hot folder for transmitting a PDF file using the same protocol as the one used for the core system on the user's host computer, it is difficult for the printer to determine whether the job has been sent from the core system or from the hot folder.

SUMMARY OF THE INVENTION

The present invention is directed to a printing apparatus that allows a user to change the operation control of a job even in an environment with a one-way communication protocol and a plurality of job routes.

According to an aspect of the present invention, a printing apparatus includes an accepting unit configured to accept a print job, a first determination unit configured to determine whether the accepted print job is a print job of a first type or a print job of a second type, a second determination unit configured to, if the first determination unit determines that the accepted print job is the print job of the first type and if a job control code included in the accepted print job indicates hold, determine that data of the accepted print job is to be held, if the first determination unit determines that the accepted print job is the print job of the first type and if the job control code included in the accepted print job indicates print, determine that the data of the accepted print job is to be printed, and if the first determination unit determines that the accepted print job is the print job of the second type, determine that the data of the accepted print job is to be held, and a control unit configured to store, in a storage unit, the data of the print job determined by the second determination unit to be held and to print the data of the print job determined by the second determination unit to be printed.

According to an exemplary embodiment of the present invention, a user can change the operation control of the job even in an environment with a one-way communication protocol and a plurality of job routes.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a flowchart illustrating an example of job generation processing performed by a job control unit.

DESCRIPTION OF THE EMBODIMENTS

Various exemplary embodiments, features, and aspects of the invention will be described in detail below with reference to the drawings.

Figure 1:
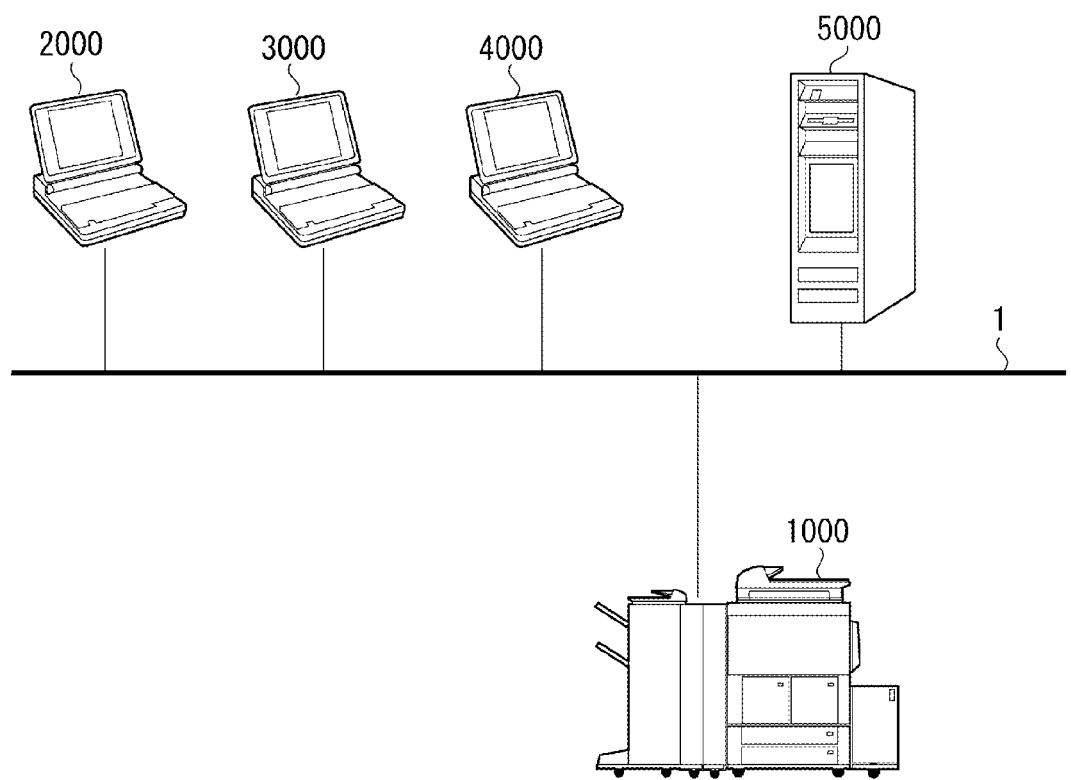
FIG. 1 illustrates an example of a system configuration of a printing system.

FIG. 1 illustrates an example of a system configuration of a printing system.

As illustrated in FIG. 1, host computers 2000 to 4000 are connected to a printing apparatus 1000 via a network 1.

A job with a control code is sent from each of the host computers 2000 to 4000 via a driver to the printing apparatus 1000. The control code of the job is a code which is associated with the apparatus. The printing apparatus 1000 receives the job via the network 1.

A server 5000 is a server of a core system and generates native PostScript. A job sent from the server 5000 is sent to the printing apparatus 1000 via the network 1. The printing apparatus 1000 receives the job.

Figure 2:
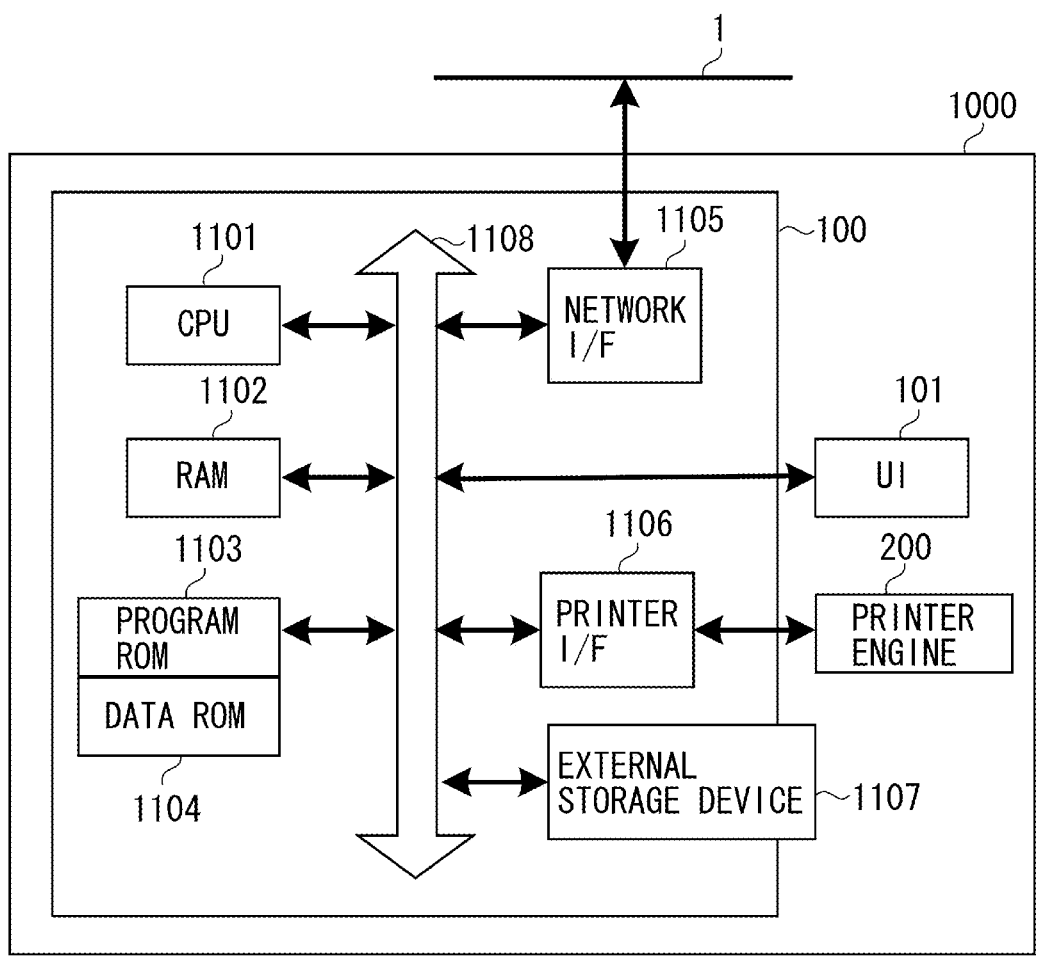
FIG. 2 illustrates a hardware configuration of a controller in the printing apparatus.

FIG. 2 illustrates a hardware configuration of a controller in the printing apparatus 1000. A controller 100 includes a CPU 1101, a RAM 1102, a program ROM 1103, and a data ROM 1104. The CPU 1101 operates based on a program stored in the program ROM 1103. The RAM 1102 serves as a main memory and an area where information is temporarily stored when the CPU 1101 operates. Static information, such as font information, which is invoked when the CPU 1101 runs a program, is stored in the data ROM 1104.

A network interface (I/F) 1105 connects the controller 100 to the network 1 and receives a job sent from the host computer or the server.

A printer interface 1106 connects a printer engine 200 to the controller 100.

An external storage device 1107 includes a storage unit such as a hard disk or a flash memory. The components 1101 to 1107 described above and a user interface (UI) 101 are connected via a system bus 1108.

Figure 3:
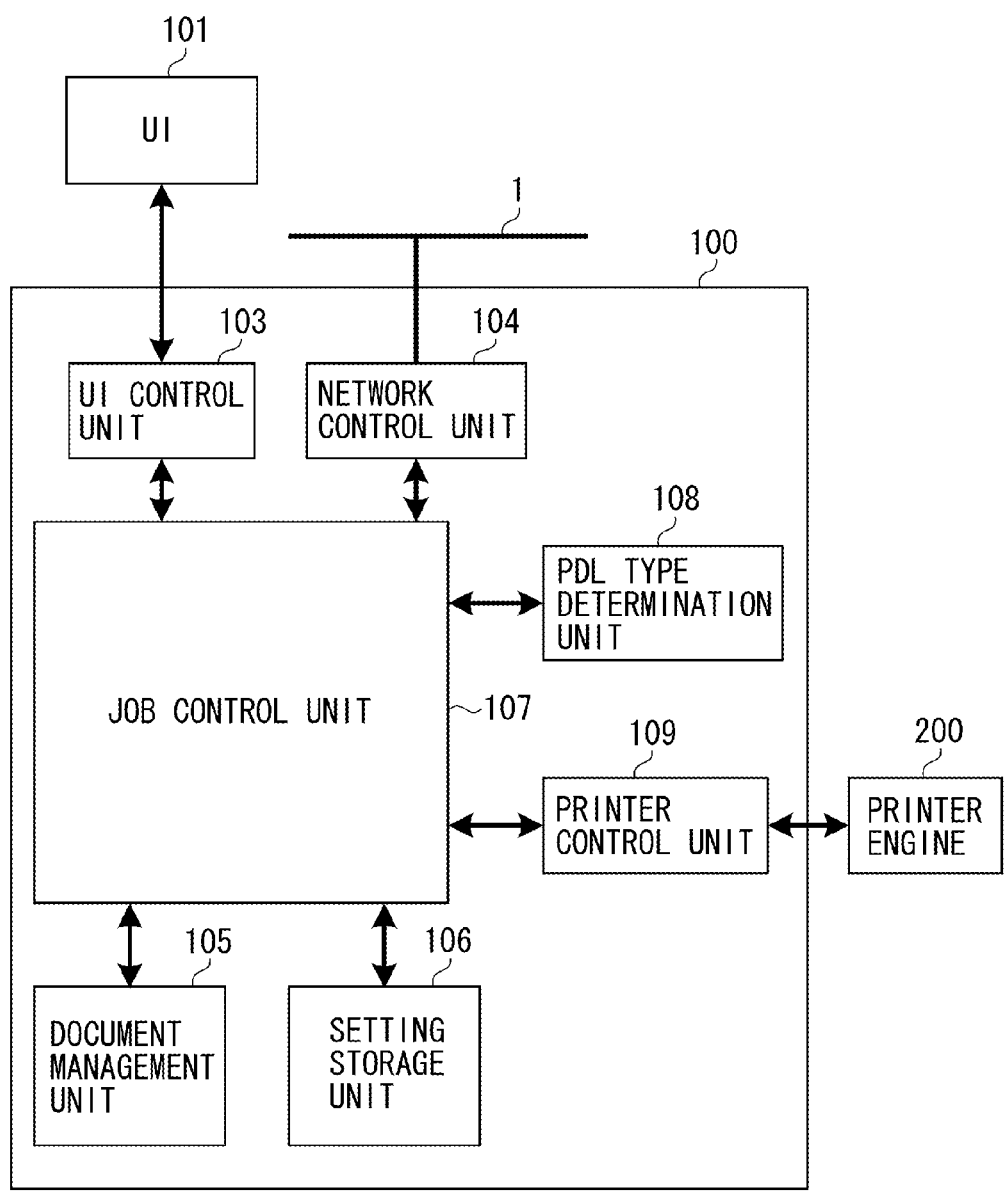
FIG. 3 illustrates a software configuration of the controller of the printing apparatus and associated components.

FIG. 3 illustrates a software configuration of the controller 100 of the printing apparatus 1000 and a configuration of the associated components.

A UI control unit 103 communicates with the UI 101.

A network control unit 104 controls the network interface 1105.

A document management unit 105 stores jobs.

A setting storage unit 106 stores user settings.

A job control unit 107 performs job control.

A PDL type determination unit 108 determines the type of PDL from the input data. The PDL is an example of a page-description language.

A printer control unit 109 controls the printer engine 200 via the printer interface 1106.

A print job submitted from an external storage device is stored in the external storage unit 1107 and managed by the document management units 105. Control and management processing of the units 103, 104, 105, 106, 107, 108, and 109 is realized by the CPU 1101 executing a program in the program ROM 1103.

Figure 4:
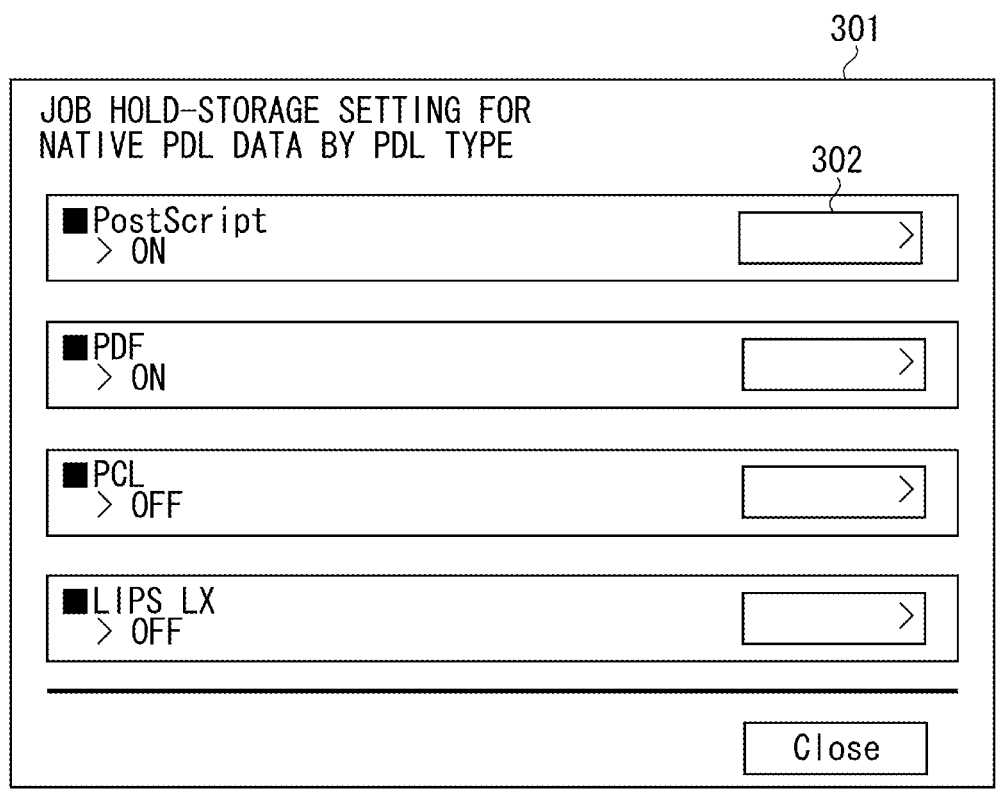
FIG. 4 illustrates an example of a screen for job hold-storage setting by the type of PDL.

FIG. 4 illustrates an example of a screen for job hold-storage setting by the PDL type which is displayed when the printing apparatus 1000 receives a job including native data (i.e., a job which does not include a job control code). A job with a job control code is not affected by the setting set via this screen.

In FIG. 4, the setting values stored in the setting storage unit 106 are displayed on the UI 101 via the job control unit 107 and the UI control unit 103. According to a setting screen 301 in FIG. 4, the job is stored on hold if the data is in PostScript or PDF, and not stored on hold if the data is in PCL or LIPS LX. The user can change the setting by using a button 302.

Figure 5:
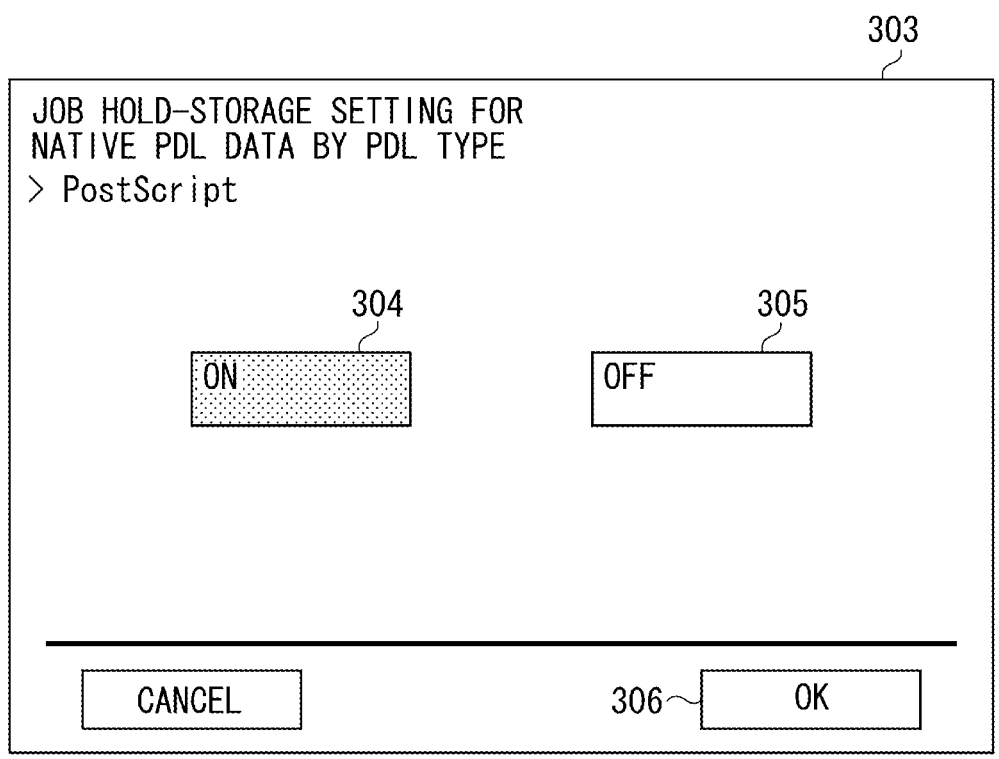
FIG. 5 illustrates another example of a screen for job hold-storage setting by the type of PDL.

FIG. 5 illustrates a setting screen 303 which is an example of a screen used for the job hold-storage setting screen by the PDL type.

The setting screen 303 appears when the user presses the button 302 illustrated in FIG. 4.

According to the example of the setting screen 303, the setting is set to ON. If the user presses an OFF button 305 and further presses an OK button 306, the setting associated with PostScript stored in the setting storage unit 106 can be changed.

Although the settings regarding whether to store a job on hold by the PDL type are illustrated in FIGS. 4 and 5, the present embodiment is not limited to such examples. For example, on a screen such as the one illustrated in FIG. 4, if a plurality of PDL types with a same setting (e.g., set to OFF) are selected, the setting of the selected PDL types can be changed (e.g., changed to ON) all together by a screen such as the one illustrated in FIG. 5. The setting can be changed from ON to OFF in a similar manner. Further, the screen may be configured such that the different settings by PDL type can be changed via one screen.

Further, although the setting of whether a job is to be stored on hold is set by the PDL type in FIGS. 4 and 5, the setting may be set such that only a particular PDL file can be stored on hold among the PDL files acceptable by the printing apparatus 1000. For example, the setting can be set such that only the PostScript and PDF files are stored on hold among the PostScript, PDF, PCL, and LIPS LX files. If the printing apparatus 1000 accepts a job in PostScript or PDF when such setting is made, the job will be stored on hold. If the printing apparatus 1000 accepts a job other than a job in PostScript or PDF, the job will be printed.

FIG. 6 is a flowchart illustrating an example of the job generation processing performed by the job control unit 107. The job control unit 107 includes the CPU 1101, the RAM 1102, the program ROM 1103, and the data ROM 1104. Procedures of the flowchart are stored in the program ROM 1103 of the job control unit 107 and executed by the CPU 1101.

Next, the job generation processing will be described with reference to FIGS. 1, 2, and 3 and the flowchart in FIG. 6.

When a job is sent from one of the host computers 2000 to 4000 to the printing apparatus 1000, the network control unit 104 detects the data, sends a notification to the job control unit 107, and starts the generation processing. In step S11, the job control unit 107 obtains a destination queue name from the network control unit 104.

In step S12, the job control unit 107 reads data for one job.

In step S13, the job control unit 107 analyzes a header portion of the job.

In step S14, the job control unit 107 determines whether a job control code is included in the print job which has been transmitted. If a job control code is included in the transmitted print job, the job control unit 107 determines that the print job is a print job of a first type. On the other hand, if a job control code is not included in the print job, the job control unit 107 determines that the print job is a print job of a second type.

The job control code according to the present embodiment is, for example, a group of common control commands such as a command of CPCA (Common Peripheral Controlling Architecture) for office devices. Such a job control code is used for realizing various functions of a printer. For example, the job control code is used for designating the sheet cassette, two-sided printing, number of copies, sorting, stapling, and discharge bin. Additionally, it is used for designating whether to hold the job.

According to the present embodiment, the job control unit 107 determines whether a CPCA command as a job control code is included in the transmitted job. If a CPCA command is included, it is determined as YES in step S14.

If a job control code is included in the header portion of the job (YES in step S14), the processing proceeds to step S15. In step S15, the job control unit 107 generates a print job or a hold job, whichever is designated by the job control code. Then, the processing illustrated in FIG. 6 ends.

Further, if a job is sent from the server 5000, the job control unit 107 reads data for one job in step S12 and analyzes the header portion of the job in step S13. In this case, since the job is written in native language, the job does not include a job control code. In other words, in step S14, since a job control code is not included in the header portion (NO in step S14), the processing proceeds to step S16. In step S16, the job control unit 107 sends some of the data received in step S12 to the PDL type determination unit 108, receives a result from the PDL type determination unit 108, and determines the native language. According to this processing, as discussed in Japanese Patent No. 2871275, data of a certain volume is transferred from the header portion to each PDL language determination unit. Then, the job control unit 107 makes the final determination of the language type. Here, a case where the job is determined as PostScript will be described. In step S17, as a result of the determination, if the job is determined as native PostScript, the job control unit 107 obtains information regarding whether the job is to be stored on hold from the setting storage unit 106.

In step S18, the job control unit 107 determines whether the destination queue name obtained in step S11 is "Hold". If the destination queue name is "Hold" (YES in step S18), the processing proceeds to step S19. In step S19, the job control unit 107 determines whether the setting of the job is "ON" in step S17. If the setting is "ON" (YES in step S19), the processing proceeds to step S20. In step S20, the job control unit 107 generates a hold job.

In step S18, if the destination queue name is "Print" or a different name (NO in step S18), the processing proceeds to step S21. In step S21, the job control unit 107 generates a print job. In step S19, if the setting is "OFF" (NO in step S19), the processing also proceeds to step S21. In step S21, the job control unit 107 generates a print job.

Then, the job generation processing ends.

The generated hold job is executed by the job control unit 107. The content of the job is analyzed and set as a stored document on the document management unit 105. Then, the hold job processing ends. On the other hand, the generated print job is executed by the job control unit 107. The content of the print job is analyzed, sent from the printer control unit 109 to the printer engine 200, and printed on paper. Then, the print job processing ends.

The attribute of the stored hold job is changed via the UI 101 and the printing processing is designated. If printing is executed, the hold job is sent from the printer control unit 109 to the printer engine 200, and the print processing ends. To be more precise, the user can change, via the UI 101, the attributes regarding the number of sheets to be printed, the print range, and the paper to be used regarding the hold job.

According to the description above, the following can be understood.

If the setting of the core system server is made such that a job is always sent to the hold queue and the hold-storage setting for a job in native PostScript is set to "OFF", a job including data in PostScript submitted from the server is immediately printed. On the other hand, if special paper is used according to the setting and the paper is not available, the user may desire to change the job setting. In such a case, if the user changes the hold-storage setting for the native PostScript to "ON", all the jobs including the data in PostScript submitted from the server, after the setting is changed, will be stored on hold. The user searches the necessary job from the jobs on hold, changes the setting, and performs printing. If the paper becomes available and the job setting can be set back to the original setting, the user prints all the remaining hold jobs and changes the hold-storage setting for the native PostScript back to OFF.

Even if another user submits a job from the driver in the meantime, the operation of the job is not affected.

Further, in a case where a job is sent from a hot folder set on the host computer 4000, if the data is not in PostScript, changes made in the setting will not affect the job operation, and the job is performed as designated. In a case where hold jobs are continuously submitted from the hot folder and the external storage device 1107 then approaches capacity, if the user changes the hold storage of PDF from "ON" to "OFF", the hold job sent from the hot folder can be immediately printed, so that the problem can be avoided.

In this manner, if either a protocol or a PDL type is different, even though the job operation is fixed on the job submission side, the job operation can be changed on the printer side by the user.

In the above-described example, the job is stored on hold only when all the conditions are set to "hold". However, there may be a structure where the job may be printed when all the settings are set to "print" and stored on hold in all the other cases.

Further, according to the example of the present embodiment, the operation of the job is either "print" or "hold". However, "store in e-mail box", "transmit via facsimile machine", and "store in external storage" may also be used.

Furthermore, for example, the job control unit 107 can uniquely set the language of the PDL data of a submitted job to a language set in advance by the apparatus.

According to the exemplary embodiment described above, the user can change the operation control of a job even in an environment with a one-way communication protocol and a plurality of job routes.

According to the above-described embodiment, whether to hold a job is set for a job that does not include a CPCA command (a job written in native language) as illustrated in FIG. 5. However, whether to hold a job can be set for a job that includes a CPCA command. In this case, the CPU 1101 determines whether to hold a job if YES in step S14 in FIG. 6 according to the setting (setting of whether to hold the print job including a CPCA command).

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-119780 filed May 25, 2012, which is hereby incorporated by reference herein in its entirety.

What is claimed is:

1. A printing apparatus comprising:
   a receiving unit configured to receive a first job and a second job from host computers over a network, the first job including both first print data and a control code indicating that a hold process is to be executed, the second job including second print data without the control code;
   a setting unit configured to set information indicative of holding print data that is written in a specific language; and
   a job control unit configured to, if the first job has been received, execute the hold process for the first print job in accordance with the control code which is included in the first job,
   wherein the job control unit is configured to, if the second job has been received and if the second print data included in the second job is written in the specific language, execute the hold process for the second print job, and
   wherein the job control unit is configured to, if the second job has been received and if the second print data included in the second job is not written in the specific language, execute the print process for the second print job.

2. The printing apparatus according to claim 1, wherein the hold process is a process for storing the first print data or the second print data until when an operator inputs a print instruction, and for printing the stored first data or second data in response to the input of the print instruction.

3. The printing apparatus according to claim 2, wherein the each of the first job and the second job further includes designation of a number of print copies, a print range, and a print paper type for the data to be printed.

4. The printing apparatus according to claim 1, wherein the language is a page description language.

5. A method for controlling a printing apparatus, the method comprising:
   receiving a first job and a second job from host computers over a network, the first job including both first print data and a control code indicating that a hold process is to be executed, the second job including second print data without the control code;
   setting information indicative of holding print data that is written in a specific language;
   controlling a job, if the first job has been received, by executing the hold process for the first print job in accordance with the control code which is included in the first job;
   controlling a job, if the second job has been received and if the second print data included in the second job is written in the specific language, by executing the hold process for the second print job; and
   controlling a job, if the second job has been received and if the second print data included in the second job is not written in the specific language, by executing the print process for the second print job.

6. A non-transitory storage medium storing a computer-executable program that executes a method for controlling a printing apparatus, the method comprising:
   receiving a first job and a second job from host computers over a network, the first job including both first print data and a control code indicating that a hold process is to be executed, the second job including second print data without the control code;
   setting information indicative of holding print data that is written in a specific language;
   controlling a job, if the first job has been received, by executing the hold process for the first print job in accordance with the control code which is included in the first job;
   controlling a job, if the second job has been received and if the second print data included in the second job is written in the specific language, by executing the hold process for the second print job; and
   controlling a job, if the second job has been received and if the second print data included in the second job is not written in the specific language, by executing the print process for the second print job.

* * * * *